Oct. 25, 1966  F. J. LUKETA  3,280,438
"G" HOOK COUPLERS
Original Filed Feb. 18, 1963  5 Sheets-Sheet 1
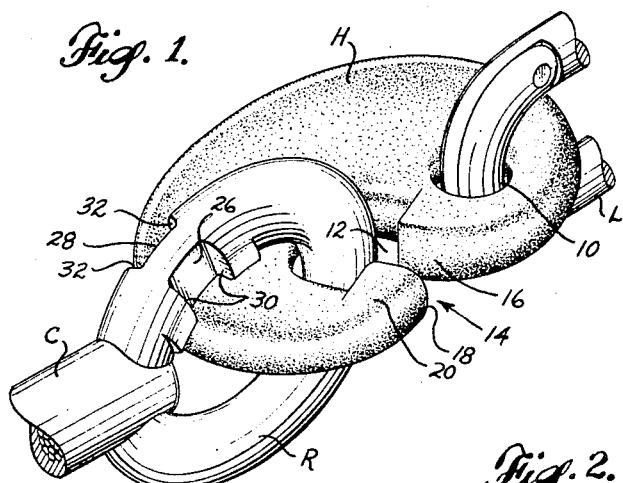
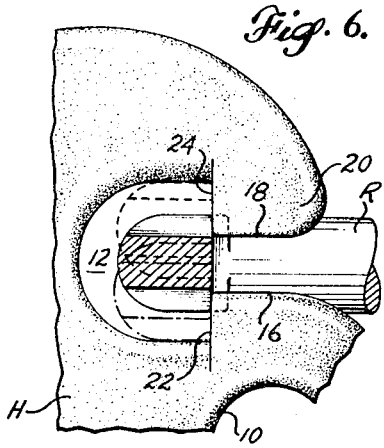
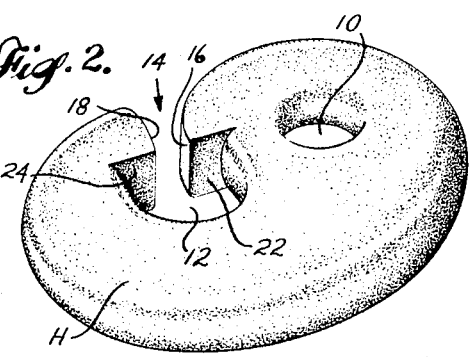
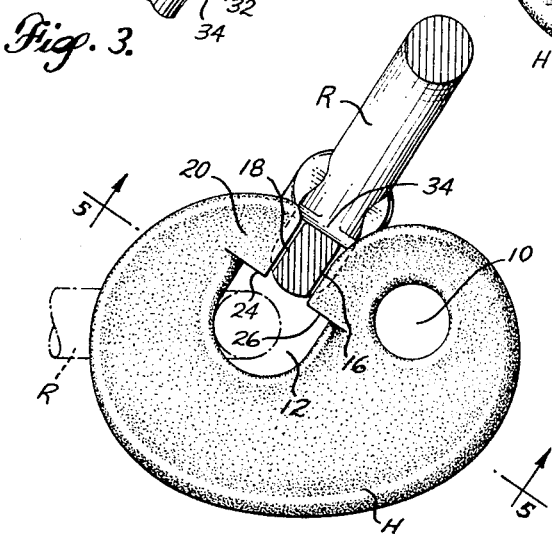
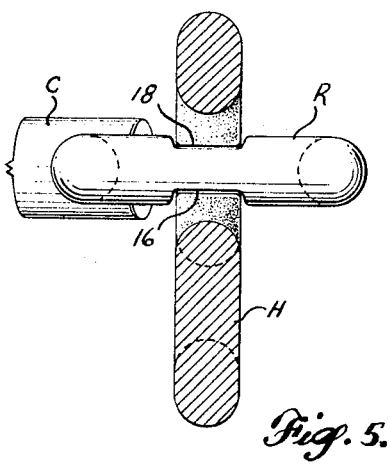
INVENTOR.
FRANK J. LUKETA
BY Mathis and Graybeal
ATTORNEYS

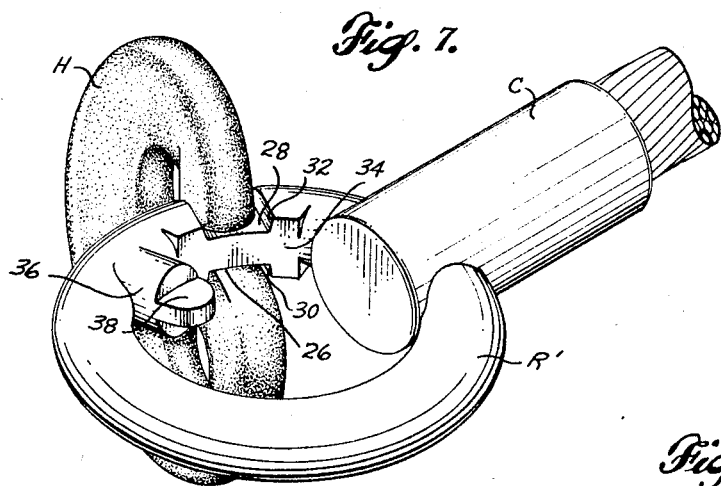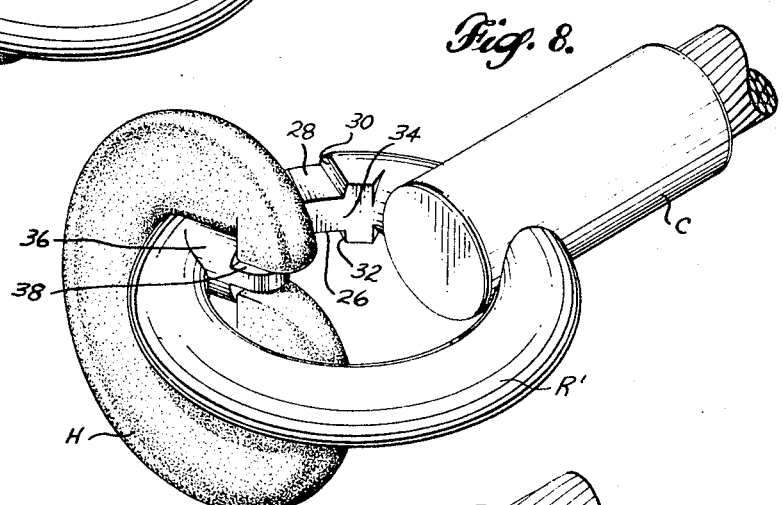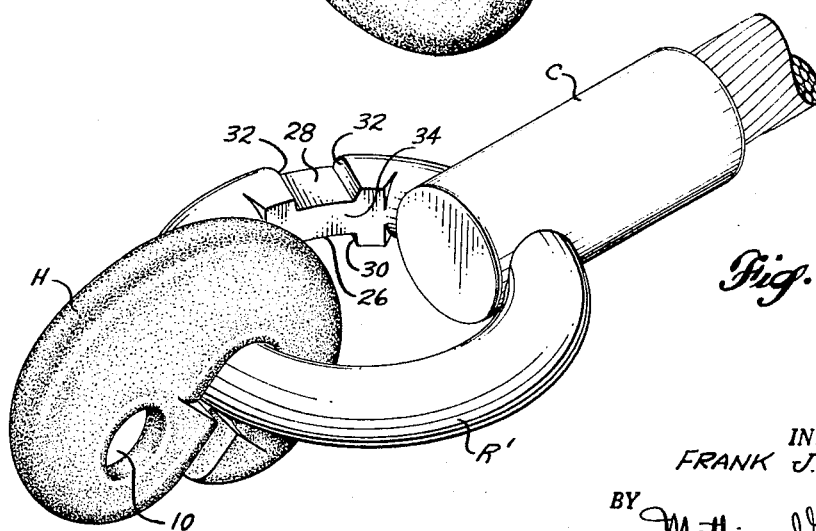

Oct. 25, 1966
F. J. LUKETA
3,280,438
"G" HOOK COUPLERS
Original Filed Feb. 18, 1963
5 Sheets-Sheet 3
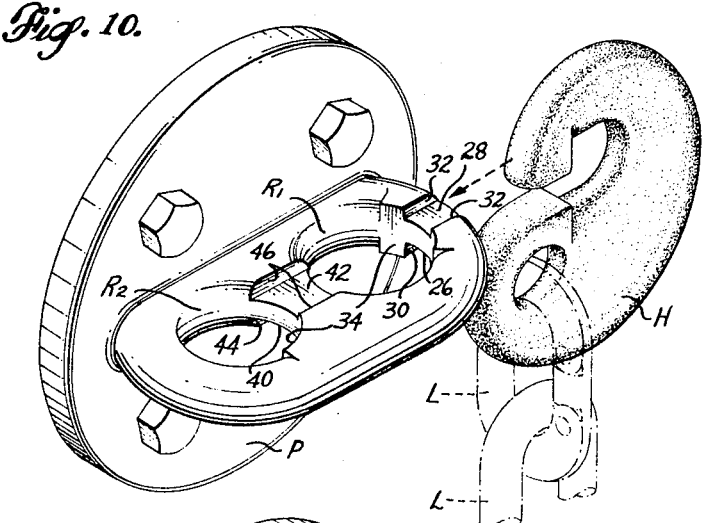
Fig. 10.
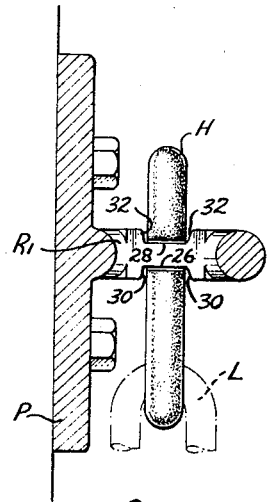
Fig. 11.
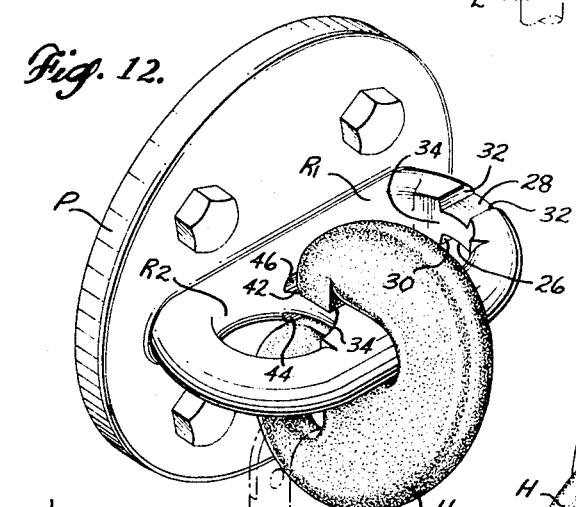
Fig. 12.
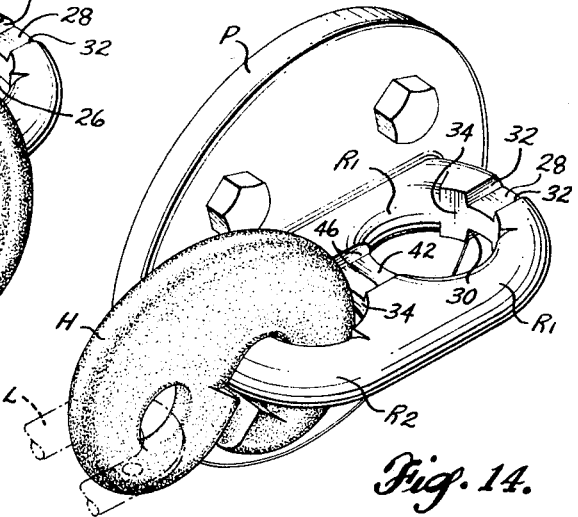
Fig. 14.
Fig. 13.
INVENTOR.
FRANK J. LUKETA
BY Mathis and Graybeal
ATTORNEYS Oct. 25, 1966 F. J. LUKETA 3,280,438
"G" HOOK COUPLERS
Original Filed Feb. 18, 1963 5 Sheets-Sheet 4
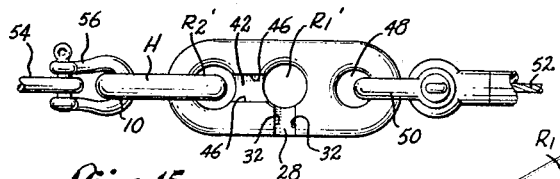
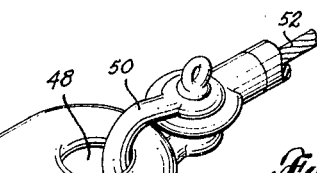
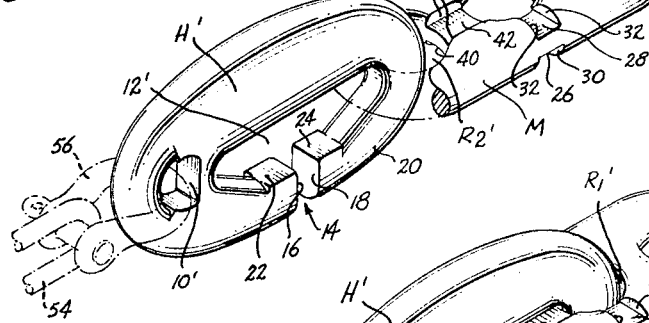
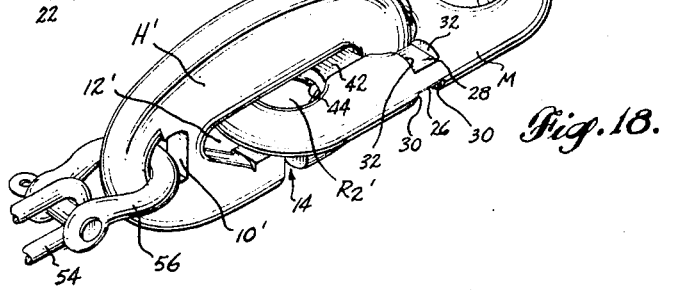
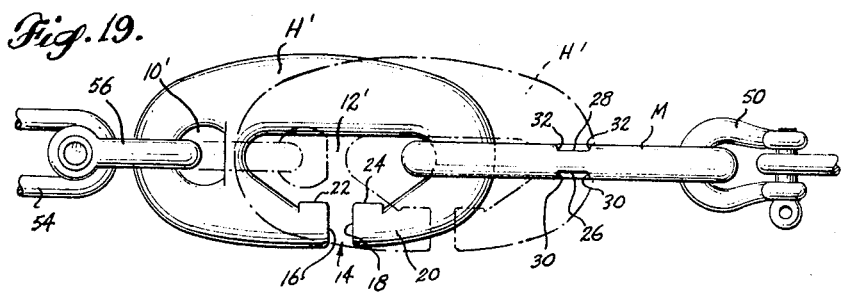
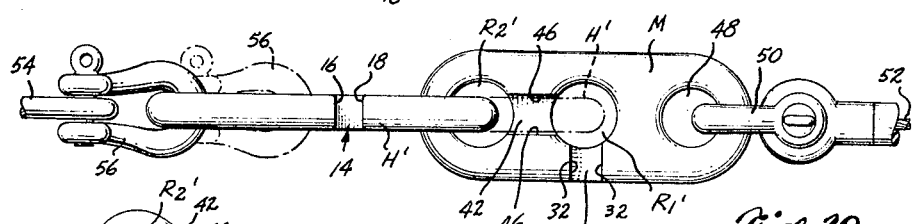
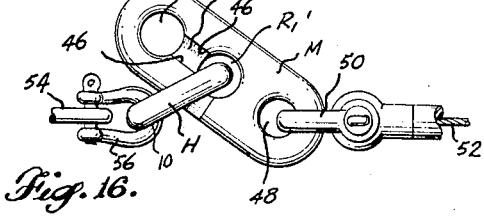
INVENTOR.
FRANK J. LUKETA
BY Mattern and Graybeal
ATTORNEYS Oct. 25, 1966  F. J. LUKETA  3,280,438
"G" HOOK COUPLERS
Original Filed Feb. 18, 1963  5 Sheets-Sheet 5

INVENTOR.
FRANK J. LUKETA
BY Mattis and Graybeal
ATTORNEYS

Patented Oct. 25, 1966

3,280,438
"G" HOOK COUPLERS
Frank J. Luketa, 5567 Greenwood Ave. N.,
Seattle, Wash. 98103
Continuation of application Ser. No. 259,453, Feb. 18,
1963. This application May 10, 1965, Ser. No. 458,817
10 Claims. (Cl. 24—201)

This application is a continuation of my copending application Serial No. 259,453, now abandoned, entitled, "G" Hook and Associated Coupling Means, filed February 18, 1963, as a continuation-in-part of my prior application Serial No. 134,038, now abandoned, filed August 14, 1961, and entitled, "G" Hook and Eye Ring Couplers.

The present invention relates to hook and ring coupling means of the engageable-disengageable type wherein an eye ring segment of reduced dimension fits into the point-to-shoulder throat of a hook for connection and disconnection of the hook from the eye ring. More particularly, certain aspects of the present invention relate to an improved form of so-called "G" hook and eye ring, wherein the hook throat and an access segment of the ring comprise lock surfaces of substantial area, which lock surfaces are relatable substantially coplanarly. Another aspect of the invention pertains to improved hook and ring couplers involving two-stage access manipulation of the hook to reach coupling position on the ring. Yet another aspect of the invention pertains to improved hook and ring couplers employing double rings with an access segment therebetween.

Application of hook and eye couplers according to the present invention can be made, for example, as engageable-disengageable components of a trawl net gear, such as disclosed in my U.S. Patent No. 3,048,936, issued August 14, 1962, and entitled, "V-Door for Trawling and Bridle Therefore."

As will be apparent, however, such hook and ring coupler means of the engageable-disengageable type are usable as well in many and widely varied applications wherein engagement or disengagement of a hook with a ring by precise manipulation of the hook is desired, and wherein the coupler in use is to be guarded against inadvertent disengagement of the hook and ring.

Conventional "G" hooks and rings, as used in the fishing industry, for example, have an eye ring with one or more reduced diameter access segments, or escape "flats," to accommodate the spacing or throat between the hook point and hook base or shoulder. In conventional design, the ring access segment and the configuration of the hook at the hook shoulder and hook point are of generally tapering contour. On an occasion where a hook throat happens to fall near the reduced dimension or flat area of the ring, the engaging surfaces being of tapering contour often tend to guide the hook throat into alignment with the ring flat and cause inadvertent disengagement.

In order to obviate such inadvertent disengagement, the hook and ring coupler of the present invention utilizes squarely oriented hook throat and ring surfaces in the area of the access segment of the ring. More particularly, the ring access segment and the hook throat are each configured to have snugly interfitting, substantially right angle related access surfaces intersecting a plane across the direction of coupling movement thereof, and each is also configured to have lock surfaces of substantial area, which lock surfaces are substantially coplanarly.

Thus, both the inner surfaces of the hook contiguous of the hook throat and the surfaces of the ring contiguous of the access segment thereof are provided with right angle related surfaces which avoid any camming action and thus prevent inadvertent disengagement of the hook from the eye, such disengagement being prevented except when a precise orientation of the hook throat with the eye ring flat segment is established.

Specific variations of hook and ring couplers configured according to the invention include a modification in eye ring construction wherein an inwardly directed stub, circumferentially offset from the access segment of the eye ring is provided, such stub being of a thickness greater than the throat dimension of said hook except for an access segment presented inwardly of the said ring, such stub access segment requiring particular orientation of the hook to permit passage of the hook circumferentially around the eye ring from the point of normal use of the hook on the ring to the point where the hook can contact the access segment of the ring. Another variation in form of hook and ring coupling according to the present invention involves a double-ring pad, such as suitable for mounting on a trawl door, which double ring pad has two structurally integrated eye rings, the first of said eye rings having a first access segment and a second access segment circumferentially spaced from the first access segment and extending between the eye rings, such second access segment being dimensioned to snugly interfit in and present substantially right angle related surfaces to the side surfaces of the square-nosed hook throat, the direction of movement of said hook throat into engagement or disengagement with the first eye ring being related substantially at right angles to the direction of movement of said hook for engagement or disengagement thereof with said second eye ring.

Still another variation in form of hook and ring coupler according to the present invention involves a double-ring such as that just described but not involving a pad and being adapted for connection to the end of a line, such as a sweep line of a trawl net, for example. This form of the invention also involves a modified form of hook construction, such hook having the access surfaces, locking surfaces, etc. of the preferred form and also an elongated inner hook area allowing for complete accommodation of the outboard ring portion of the double-ring member when the hook is engaged in use position within the inboard ring portion.

These and other objects, features, advantages and characteristics of engageable-disengageable hook and ring couplers according to the present invention will be apparent from the following typical and therefor non-limitive embodiments of such couplers as discussed below, in conjunction with the accompanying illustrations thereof, wherein like letters and numerals refer to like parts, and prime letters and numerals refer to similar parts, and wherein:

FIG. 1 is a perspective view of a hook eye ring coupler according to the invention;

FIG. 2 is a perspective view of the hook per se, as viewed from an aspect opposite to the view of FIG. 1;

FIG. 3 is a fragmentary perspective view of the access segment of the coupler ring shown in FIG. 1, showing the inner detail thereof;

FIG. 4 is a view taken radially of the coupler eye in a plane transversely through the access segment of the eye ring to illustrate the relation of the hook and eye during connection or disconnection movement therebetween;

FIG. 5 is a view taken substantially along line 5—5 of FIG. 4, showing further detail of the substantially right angle related access surfaces of the eye and hook throat;

Figure 21:
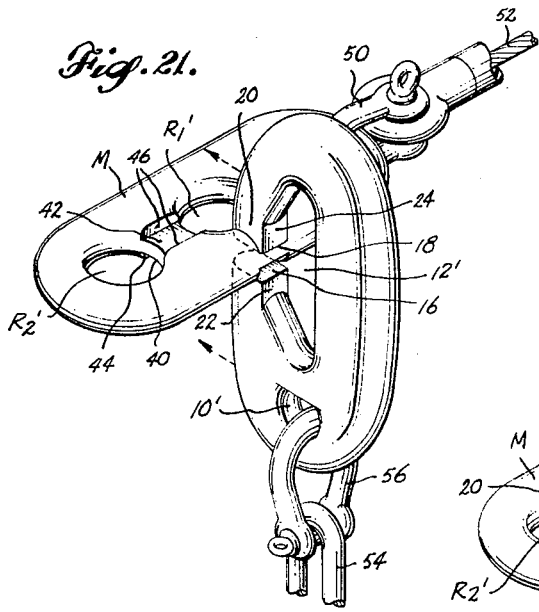
Figure 22:
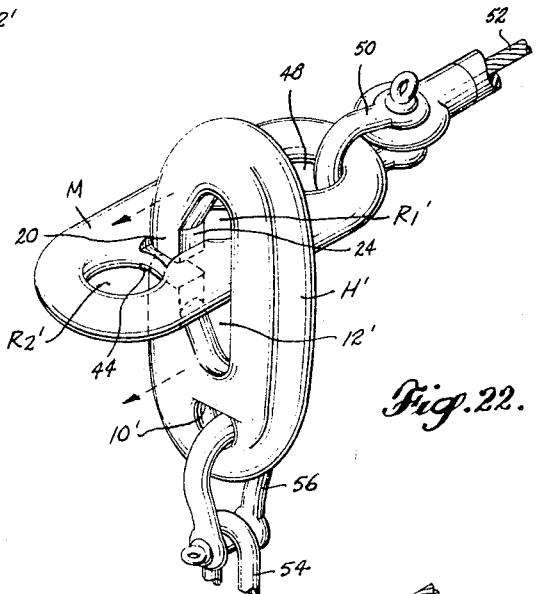
Figure 23:
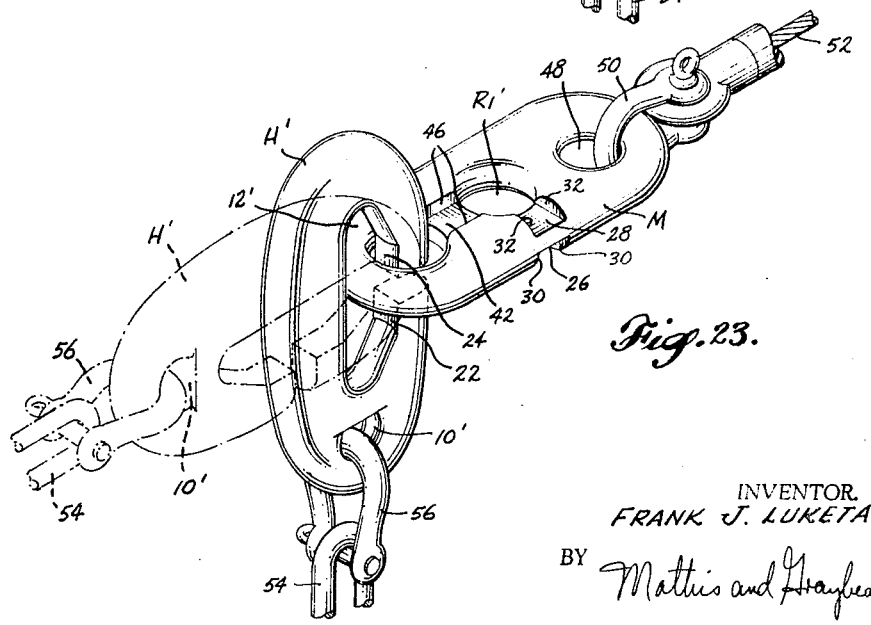

FIG. 6 is a further view on an enlarged scale of fragmentary portions of the hook and eye ring shown in FIG. 1, the ring and hook being shown in interfitting relation, the view of said FIG. 6 serving to show the substantially coplanar relation of the lock surfaces of the hook and eye ring, with the precise orientation of the hook throat with respect to the eye ring for access being shown by eye ring detail in solid line, and with relatively offset or locked positions thereof being shown by broken line;

FIG. 7 is a perspective view of a square-nose G hook according to the present invention, in access position on an eye ring of modified design, wherein said eye ring has an inwardly directed access stub;

FIG. 8 is a further view of the hook and eye ring shown in FIG. 7, with the throat of the hook in access position with respect to the ring stub;

FIG. 9 is a further view of the hook and eye ring shown in FIGS. 7 and 8, with the hook in use position;

FIG. 10 is a perspective view of a further modification as to eye ring construction for use with a square-nose G hook, such modified construction involving a double-ring pad;

FIG. 11 is a view in diametric cross-section through the first ring of the pad shown in FIG. 10, such view further showing the snugly interfitting, substantially right angle related access surfaces of the hook and this ring;

FIG. 12 is a further view of the hook and ring pad shown in FIG. 10, with the hook in access orientation with respect to the access segment between the two eye ring portions of the pad;

FIG. 13 is a view in cross-section, taken diametrically through the second ring of the pad, showing the relation of hook throat surfaces and the inter-ring access segment when the hook is in the access position shown at FIG. 12;

FIG. 14 is a view of the hook and pad shown in FIGS. 10-13, with the hook in use position;

FIG. 15 is a view of a modified form of hook and double-ring coupler for use in line-to-line connections, with the hook shown engaged in use position within the outboard ring;

FIG. 16 is a view of the coupler of FIG. 15, with the hook positioned within the inboard ring;

FIG. 17 is a perspective view of a hook and double-ring coupler comprising the double-ring member shown in FIGS. 15 and 16 and a modified form of "G" hook, such modified hook form having an elongated hook area, and said view showing the hook engaged in use position within the outboard ring;

FIG. 18 is a perspective view of the hook and double-ring coupler of FIG. 17, showing the hook engaged in use position within the inboard ring;

FIG. 19 is a further view of the hook and double-ring coupler of FIG. 17, and includes a side view of the hook, with a solid line showing of the hook engaged in use position within the outboard ring and a broken line showing of the hook engaged in use position within the inboard ring;

FIG. 20 is a bottom plan view of FIG. 19;

FIG. 21 is a perspective view of the hook and double-ring coupler of FIG. 17, showing the hook in access position relative to a first access segment, with the direction of movement into the inboard ring being indicated by indicta arrows;

FIG. 22 is a further view of the hook and double-ring coupler shown in FIG. 7, showing the throat of the hook in access position with respect to the outboard ring, with the direction of movement into the outboard ring being indicated by indicta arrows; and FIG. 23 is a further view of the hook and double-ring coupler of FIGS. 17-22, showing in solid lines the hook in the position which it occupies immediately upon entering the outboard ring, and showing in broken lines such hook engaged in use position within the outboard ring.

Turning to a specific consideration of the hook and eye ring coupler shown at FIGS. 1-6, the view of FIG. 1 is of a typical use of such hook H and eye ring R for joining a lazy line chain link L and the swaged end of a sweep line C, for example. In use, of course, one segment to be coupled, such as chain link L, is placed in the hook eye 10, and the other segment to be coupled, such as line C, is joined to the ring R. With hook H and ring R connected, the inner hook area 12 loosely accommodates the ring R. Access of the ring R into area 12 of hook H is through the point-to-shoulder hook throat, designated 14, which throat is defined by a shoulder surface 16 and a surface 18 of hook point 20. Also forming an integral and essential part of the ring receiving area 12 are shoulder lock surface 22 and point lock surface 24, which lock surfaces 22, 24 are of substantial area for reasons hereinafter discussed in detail in connection with the showing of FIG. 6.

As shown in FIGS. 1 and 3, for example, the access segment of ring R is configured to have respectively parallel inset surfaces 26, 28 of suitable thickness and of a width between respective end walls 30, 32 to snugly accommodate the hook throat 14 (FIG. 5), said end walls 30, 32 being arranged substantially at right angles to surfaces 26, 28 so as to also be in relatively snug relation to the side surfaces of hook shoulder 16 and hook point 20 (again note FIG. 5) when the hook throat 14 is precisely aligned with said surfaces 26, 28, 30, 32.

The right angle relationship of end walls 30, 32 to surfaces 26, 28 and the right angle relationship of surfaces 26, 28 to lock surfaces 34 define a generally square cornered or "squared" access segment. Likewise, the right angle relationship of throat surface 18 to lock surface 24 and the two parallel side surfaces of hook H define a generally square cornered or "squared" hook point, and the right angle relationship of throat surface 16 to lock surface 22 and the parallel side surfaces of hook H give the hook shoulder a generally square cornered or "squared" shape or appearance. As most clearly shown in FIG. 5, the square cornered hook point 20 snugly fits within one of the square cornered inset sections of the access segment, and the square cornered hook shoulder snugly fits within the second inset section.

Also important to the configuration of ring R is a somewhat arcuate but substantially planar inner surface 34 spanning the access segment of the ring R. Said surface 34 may be termed a ring lock surface and extends substantially perpendicularly of a radius of ring R directed to the center of the ring access segment. Said ring lock surface 34 widens out at each end of the access segment whereat it is an inwardly facing surface portion of side protuberances which are formed on the ring at each end of each side surface 26, 28.

Said ring lock surface 34 cooperates with hook shoulder lock surface 22 and hook point lock surface 24 in the manner portrayed at FIG. 6 to provide that disengaging movement of the hook H with respect to the ring R can occur only when the hook throat is in precise alignment with access surfaces 26, 28, 30, 32 of the ring. Otherwise, if there is misalignment such as shown by broken line in FIG. 6, the lock surface 34 abuts one or the other of lock surfaces 22, 24 and prevents decoupling movement, and the substantially coplanar relation of said lock surface 34 with said lock surfaces 22, 24 obviates the camming action found to be troublesome with hook and ring couplings of conventional design.

FIGS. 7-9 serve to illustrate a variation in configuration of eye ring, designated R'. In this modification, the eye ring R' is provided with the access segment configuration 26, 28, 30, 32, 34 as shown and discussed with respect to eye ring R, and in addition comprises a short, inwardly and substantially radially extending stub 36 which is circumferentially offset from the access segment 26, 28, 30, 32, 34 and is configured to present at its inner end a stub access segment 38 of a thickness less than the throat dimension of hook H, the thickness of the remainder of stub 36 being greater than the throat dimension of hook H. By this configuration of the eye ring R', manipulation of the hook H into normal use position on ring R' requires that the hook throat first be installed on the ring by alignment of the throat with the access segment surfaces 26, 28, 30, 32 (as in FIG. 7), then moving of the hook H circumferentially around ring R' in an orientation so that the hook throat clears stub access segment 38 (as in FIG. 8), then orienting the hook H for normal use position (as in FIG. 9). As will be apparent, the stub 36 provides an additional safeguard against inadvertent alignment of the hook throat with access segment surfaces 26, 28, 30, 32 in that under at least most use conditions the hook H will not even pass the stub 36. Such stub 36 and the ring access segment 26, 28, 30, 32, 34 thereby provide what may be termed a two-stage locking arrangement ensuring that the hook H and ring R' do not inadvertently disengage during use. Manifestly, while stub 36 is shown in radial orientation with respect to the annular configuration of ring R', such orientation can be in any desired direction other than radial.

FIGS. 10–14 show a further variation in eye ring design for use in conjunction with hook H. In this variation, the eye ring is a component of what may be termed a double-ring pad P which is bolted onto or otherwise structurally integrated with structure to which a link L or the like is to be connected, such as a trawl door, for example. Pad P presents integrally formed rings R1 and R2, the ring R1 being provided with an access segment configured to present surfaces 26, 28–34 to the throat of hook H, the attitude of approach of hook H to ring R1 being the same as the access relation shown and discussed in connection with FIGS. 1–6. With the hook H thus installed on ring R1 (in the manner shown at FIGS. 10 and 11), the hook H is then moved circumferentially around ring R1 about 90°, at which point the hook H can be moved sidewise into access engagement with a second access segment arranged between rings R1 and R2. Such second access segment is configured to present access surfaces 40, 42 with a thickness dimension therebetween only slightly smaller than the throat dimension of hook H, which access surfaces 40, 42 have associated therewith respective end walls 44, 46, the placement of said end walls 44, 46 being substantially as shown in FIG. 13 to at least in part snugly interfit and present substantially right angle related surfaces to the side surfaces of the hook point and shoulder.

As will be apparent, the direction of movement of the hook throat into engagement or disengagement with the pad P involves two-stage movement of the hook with the hook oriented in one attitude with respect to the pad P in access to ring R1 (as in FIG. 10), and with the hook oriented substantially at right angles to the first orientation, for access to ring R2 (FIG. 12).

With the hook thus installed on ring R2, it can then be oriented to a normal use attitude (as in FIG. 14), in which position it will be apparent that inadvertent disengagement of the hook H from pad P is prevented by both access segment 40, 42, 44, 46 and by access segment 26, 28, 30, 32, 34.

With the hook H installed in use position on ring R2, a second hook H or the like can be installed on ring R1 to provide a further coupling to pad P, if desired. Further variations of multiple-ring arrangement will be evident wherein a hook H can be lockably related to each successive ring R1, R2, and so on.

FIGS. 15–23 show a further variation in eye ring design involving a multiple-ring (of the double ring type), constructed essentially along the lines of pad P (FIGS. 10–14), but being adapted for line-to-line connection. This form of eye ring can be used with hook H, and even with conventional hooks if necessary, but it is preferred that it be used in conjunction with the modified form of hook H', shown in FIGS. 17–23.

Turning to a specific consideration of FIGS. 15–23, ring portions R1' and R2' are integrally connected together and with eye portion 48, and these three portions together make up the ring member M. Eye portion 48 is axially aligned with ring portions R1', R2', and it accommodates a clevis or shackel 50 (or a similar device) which is connected in turn to one end of a line, such as a sweep line 52 of a trawl net, for example. Hook H (FIGS. 15 and 16) and hook H' (FIGS. 17–23) are also shown connected to a line such as a trawl net lazy line chain 54, for example, by means of a second clevis or shackle 56.

FIG. 15 shows that when hook H is used to form a coupling with ring member M, and such hook H is engaged within outboard ring portion R2' and the coupling is under tension, hook-to-ring contact is made within the line of pull, such line of pull extending through the coupling in a straight line between eye portion 10 of hook H and eye portion 48 of ring member M.

FIG. 16 shows the situation existing when hook H is engaged within inboard ring portion R1' and the coupling is under tension. In this situation line 52 pulling eye portion 48 of ring member M in one direction and chain 54 pulling eye portion 10 of hook H in the opposite direction, tend to straighten out the coupling and locate the point of contact of hook H with the inner surface of ring portion R1' within the line of pull through the coupling. However, this is prevented by the fact that the inner hook area 12 (not visible in FIG. 16), is not large enough to accommodate outboard ring portion R2'. Consequently, hook-to-ring contact is made at a location laterally offset to one side of the line of pull, creating a bending moment which acts on both the hook H and the ring member M, tending to deform them. Such deformation is more likely to occur to hook H because it has the shallowest depth of the two in the direction of bending and consequently a smaller section modulus available to resist bending. This bending problem is overcome by the modified form of hook H' which is shown in the FIGS. 17–23 and is described in more detail below.

Whereas hook H has a relatively small, substantially D-shaped inner hook area 12 (see FIG. 6 which is drawn to approximate scale), hook H' has an elongated, somewhat trapezoidal shaped inner hook area 12'. In other respects hook H' is substantially identical in construction to hook H, i.e., hook H' has a throat portion 14 defined by a shoulder surface 16 and a point surface 18, which surfaces are planar in form and arranged substantially parallel to each other. Substantially coplanar lock surfaces 22, 24 form an essential part of ring receiving area 12', and the function of such surfaces is the same as the corresponding surfaces of hook H. This hook H' also has a generally square cornered or "squared" hook point 20 and a generally square cornered or "squared" hook shoulder. As most clearly shown in FIG. 21, the square cornered hook point 20 snugly fits within one of the square cornered inset sections of the access segment and the square cornered hook shoulder snugly fits within the second inset section.

During engagement the attitude of approach of hook H' to ring R1' is substantially the same as the access relation shown and discussed in connection with FIGS. 1–6 and 10–14. With the throat portion 14 of hook H' precisely aligned with an access segment leading into ring R1' (in the manner shown in FIG. 21 by a set of broken arrows), the hook H' is then moved in the direction indicated by the arrows, and once inside ring R1' is then moved sideways into access engagement with the second access segment arranged between rings R1' and R2' (in the manner shown in FIG. 22, the direction of movement being indicated by a second set of broken arrows), with the sideways movement being continued until throat portion 14 has cleared the second access segment and hook H' is within ring R2' (as shown in solid line in FIG. 23).

Access segment 26, 28, 30, 32 is identical in construction to the access segment of pad P bearing the same reference numeral designation.

If desired, a further access segment (not shown) which is identical to access segment 26, 28, 30, 32, but situated at the opposite side of ring R1', can be provided for facilitating coupling and uncoupling of the associated hook.

The access segment situated between ring portions R1', R2' is identical to the second access segment forming a part of pad P (FIGS. 10–14) and includes access surfaces 40, 42 having associated therewith respective end walls 44, 46, the placement of said end walls 44, 46 being substantially as shown in FIG. 22 to at least in part snugly interfit and present right angularly related surfaces to the side surfaces of the hook point and shoulder.

With the hook installed on ring R2', it can then be oriented to a normal use position (as shown in broken line in FIG. 23), in which position it will be apparent that inadvertent disengagement of the hook H' from member M is prevented by both access segment 40, 42, 44, 46 and by access segment 26, 28, 30, 32, 34.

If either prior to or during use of the coupling, hook H' in some manner slips from ring R2' into ring R1' (or in the event hook H' is purposely engaged within ring R1'), as soon as tension is next applied to the coupling, hook H' will assume the in use position illustrated by solid lines in FIG. 18 and by broken lines in FIGS. 19 and 20. In such position inner hook area 12' loosely accommodates ring portion R2' of ring member M, making it possible for the hook to make contact with an inner surface of ring portion R1' at a location coinciding with the line of pull, such line of pull extending in a straight line between eye portion 10' of hook H' and eye portion 48 of ring member M.

As will be apparent, the eye ring forms characterized by two-stage access of the hook to use position (i.e., the form of FIGS. 7–9, the form of FIGS. 10–14 and the form of FIGS. 15–23) have novel and advantageous features irrespective of the specific hook throat and ring access segment configurations employed. Thus, for example, two-stage access for conventionally formed hooks (such as provided by the double eye rings 33 with access segments 33' and 33'' as shown in my said U.S. Patent No. 3,048,936) can be employed in certain instances where the added advantages of squarely related access surfaces are not deemed essential for a practical installation.

From the foregoing, further variations, adaptations, modifications and characteristic features can be evolved by those skilled in the art to which the invention is addressed, within the scope of the following claims.

What is claimed is:

1. A hook and ring coupler comprising a coupling hook and a coupling ring member, said coupling hook having a point opposed by a shoulder providing an access throat therebetween, said coupling ring member having an open interior, an access segment of reduced dimension providing an entrance and an exit for the coupling hook into and out from said open interior, and including at least one inset side surface, a protuberance at each end of said inset side surface projecting outwardly from a side of said ring generally perpendicularly to the direction of coupling and decoupling movement of the hook at the access segment, lock surfaces of substantial area on each said protuberance facing inwardly into said open interior, said coupling ring member being of rounded cross-section in the portions thereof immediately adjacent each said protuberance, said hook throat and said coupling ring access segment each being configured to snugly interfit the other, each snug interfit together with the protuberances and the said lock surfaces serving to prevent disengagement of the hook from the ring except when a precise orientation of the hook with respect to the ring occurs.

2. A hook and ring coupler according to claim 1, wherein the said coupling ring comprises a substantially flat inwardly facing lock surface at the access segment, between the protuberances.

3. A hook and ring coupler of the connect-disconnect type, said coupler including a multiple-ring member comprising an outboard ring portion, an inboard ring portion, and eye means for attaching said member to a line, with the outboard ring portion, the inboard ring portion and the eye means being in substantial axial alignment, the said coupler further comprising a coupling hook having an inner hook area and a square cornered point opposed by a square cornered shoulder providing an access throat therebetween, with said inboard ring portion ring being formed to include a first access segment of reduced dimension, providing an entrance and exit for the hook into and out from the multiple-ring member, with said inboard ring portion also having a second access segment of reduced dimension circumferentially spaced from said first access segment and extending between said inboard ring portion and the outboard ring portion, and with said first and second access segments being dimensioned to snugly interfit the hook throat.

4. A hook and ring coupler according to claim 3, wherein the inner hook area is axially elongated to enable the outboard ring portion of the ring member to be loosely accommodated therein when the hook is engaged within the inboard ring portion.

5. A hook and eye coupler comprising a coupling hook having an elongated, substantially trapezoidally-shaped inner hook area and a square cornered point opposed by a square cornered shoulder and defining an access throat therebetween, and an elongated ring member having an outboard ring portion at one end thereof, eye means for fastening said member to a line at the other end thereof, and an inboard ring portion positioned between and substantially in axial alignment with said outboard ring portion and said eye means, with said inboard ring portion having a first access segment of reduced dimension leading into it from a side location, said inboard ring also having a second access segment of reduced dimension circumferentially spaced from said first access segment and extending between said inboard ring portion and said outboard ring portion, with said first and second access segments being dimensioned to snugly interfit the hook throat.

6. A hook and ring coupler according to claim 5, wherein the substantially trapezoidal shaped inner hook area has sufficient length to loosely accommodate the outboard ring portion when the hook is engaged within the inboard hook portion, and the shorter base of said substantially trapezoidal shaped inner hook area is substantially defined by a first lock surface on the hook point and a second lock surface on the hook shoulder, said lock surfaces being of a substantial area and being related substantially coplanarly.

7. A hook and ring coupler in accordance with claim 6, wherein each ring access segment consists of parallel inset surfaces bounded at their ends by end walls and being of a width between the respective end walls to snugly accommodate the square cornered hook point and square cornered hook shoulder portions, respectively.

8. A hook and ring coupler of the connect-disconnect type, comprising a coupling ring having an access segment with flat, inset side surfaces and end walls disposed substantially at right angles to said side surfaces, and a coupling hook configured to include an inner hook area and a square cornered point opposed by a square cornered shoulder providing an access throat therebetween, said coupling hook also including an eye portion, said coupling ring access segment being configured to include inwardly facing lock surfaces of substantial area disposed substantially at right angles to both the flat side surfaces and the end walls of the access segment, said ring comprising side protuberances at each end of each flat side surface of said access segment, and predominantly having a generally circular cross-section except at the access segments and at the protuberances, and said inwardly facing lock surfaces on said ring extending across the ring at said protuberances, and there being of a width substantially equal to the cross-sectional diameter of said ring, said square cornered point and said square cornered shoulder of the hook each having inwardly facing lock surfaces of substantial area, said lock surfaces of said ring and said hook being relatable substantially coplanarly.

9. A hook and ring coupler according to claim 1 wherein the said coupling ring member includes two inset side surfaces, directly opposite each other on opposite sides of the ring, and four of said protuberances, one at each end of each said inset side surface, and wherein the coupling ring member possesses a generally D-shaped cross-section at the protuberances, with the said flat lock surfaces forming the flat side of such shape.

10. A hook and ring coupler comprising a coupling hook having an inner hook area and a square cornered point opposed by a square cornered shoulder providing an access throat therebetween, and a multiple-ring member having a first ring portion, an access segment leading into said first ring portion from one side of the ring member, a second ring portion adjoining the first, and second access segment circumferentially spaced about the first ring portion from said first access segment, and extending between said first and second ring portions, with said first and second access segments being dimensioned to snugly interfit the hook throat, with said ring portions being thicker than the hook access throat is wide, except at the access segments, with the inner hook area being of a size large enough to span and fully accommodate the second ring portion when the hook is connected in the first ring portion, each ring access segment consisting of parallel, inset side surfaces bounded at their ends by end walls and being of a width between the respective end walls to snugly accommodate the square cornered hook point and square cornered hook shoulder portions, respectively, of the hook, the first ring portion comprising side protuberances at each end of at least one of its access segments, and predominantly having a generally circular cross section except at the access segments and the protuberances, and at the protuberances including inwardly facing lock surfaces of substantial area disposed substantially at right angles to the side surfaces and the end walls of the access segments, said lock surfaces being of a width substantially equal to the cross-sectional diameter of said ring portion.

References Cited by the Examiner

UNITED STATES PATENTS

| | | |
|---|---|---|
| 537,840 | 4/1895 | Maine. |
| 1,407,370 | 2/1922 | Blee. |
| 1,478,507 | 12/1923 | Brooks. |
| 1,546,430 | 7/1925 | Blitz _____ 24—230.5 |

FOREIGN PATENTS

| | | |
|---|---|---|
| 568,911 | 4/1924 | France. |
| 915,352 | 11/1946 | France. |
| 16,908 | 9/1893 | Great Britain. |
| 389,373 | 3/1933 | Great Britain. |

BERNARD A. GELAK, *Primary Examiner.*